April 28, 1959     G. SPENGLER ET AL     2,883,855

GREASE TESTING MACHINE

Filed July 19, 1954

INVENTORS
Gunter Spengler
Gunter Lohman

BY *Moore & Hall*

ATTORNEYS

United States Patent Office 2,883,855
Patented Apr. 28, 1959

2,883,855
GREASE TESTING MACHINE

Günter Spengler, Munich, and Günter Lohmann, Schweinfurt, Germany

Application July 19, 1954, Serial No. 444,264

Claims priority, application Germany July 20, 1953

13 Claims. (Cl. 73—10)

Certain known laboratory methods have heretofore been used to test the lubricating properties of greases intended to serve as lubricants. In many cases, however, it has been found that the results of laboratory investigations do not permit reliable conclusions to be drawn from such results as regards the lubricating power of a given grade of grease under operating conditions encountered in practice; it has even been found that samples containing one and the same type of grease, while yielding completely identical analytical results, may exhibit an entirely different behaviour in practice.

In view of the known fact that tests of a chemical and/or physical nature show the above-mentioned deficiencies, there have been constructed grease testing machines in which the grease under test has to lubricate an actual bearing. The results of measurements, under a given set of operating conditions, of the frictional moment and the temperature of the test bearing and of observations of the behaviour of the grease have been found to yield reliable indications, even to an exhaustive extent, as regards the behaviour of the grease under practical operating conditions.

Experience has shown that even when uniform conditions are maintained during grease tests discrepancies are found in the test results, which discrepancies do not permit of different types of grease to be satisfactorily compared with each other. This observation is accounted for by non-uniform operation of the test bearing, especially in cases in which a plain journal bearing is used. Where antifriction bearings, i.e. ball or roller bearings, are used, the main factor causing the above-mentioned discrepancies has been found to be the variations in bearing play or clearance, these variations resulting in frictional moments of different magnitude being set up.

According to the invention it is possible, in a grease testing machine designed to determine the lubricating properties of grease from the frictional moment and the operating temperature of antifriction bearings, to eliminate the hereinbefore mentioned deficiencies of known arrangements by using test bearings of a type which may be subjected to axial preloading. For this purpose, bearings of the so-called open or dismountable type have been found the most suitable, two bearings of this type being arranged co-axially so as to be symmetrical in relation to one another. In a specific embodiment of the present invention the test bearings of the type indicated may be arranged in a chamber which is filled with the grease to be tested.

By the provision of an axial preload acting on the antifriction bearings any bearing clearance is eliminated, the result being play-free operation of the test bearings. Roller bearings are more suitable for use in a grease testing machine than are ball bearings, since the former, while also being subject to rolling friction, exhibit a higher proportion of sliding friction than the latter. The above-mentioned requirements are fulfilled, for example, by tapered roller bearings and by self-aligning roller bearings, as part of the friction occurring in these bearings is sliding friction, and because they permit play-free operation under a suitable preload in an axial direction.

The foregoing objects, advantages, construction and operation of the present invention will become more readily apparent from the following description and accompanying drawings, in which.

Figure 1:
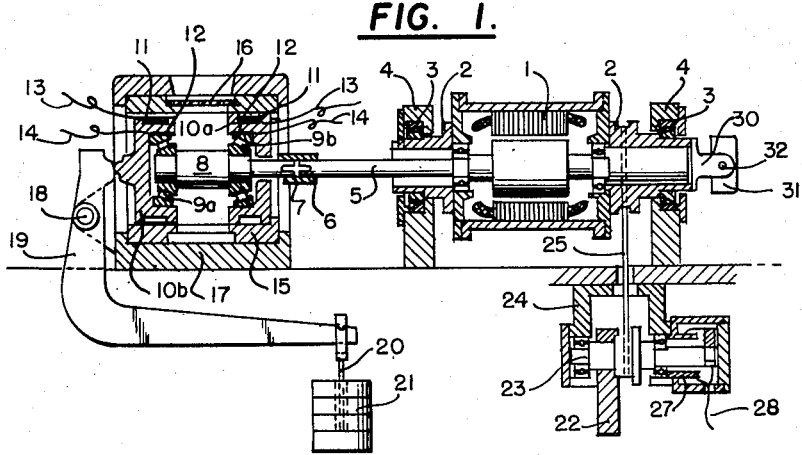
Figure 1 is a cross-sectional view illustrating an improved grease testing machine constructed in accordance with the present invention.

As will be seen in Figure 1 of the drawings, the inner race rings or cones of a pair of tapered roller bearings 9a and 9b, which function as the test bearings, are mounted on the shaft 8 of the testing machine, this shaft being coupled to a starting motor 1 which is supported to permit rotation as a whole in either direction so as to enable the friction in the test bearings to be determined. The outer race ring or cup of the roller bearing 9b is rigidly mounted within a fixed chamber 15 which, if desired, may have additional heating and/or cooling means incorporated therein. The outer race ring or cup of the roller bearing 9a is arranged within a sleeve member 10b mounted in the chamber 15 for sliding movement towards the test bearing 9b under the influence of an axial or thrust load imposed thereon by structure 18—21, to be described. No additional means are required besides the two test bearings 9a and 9b to provide for a satisfactory support of the shaft 8 and for smooth and quiet operation of the test bearings. It will be appreciated from the foregoing that this arrangement provides for play-free operation of the two bearings and that the bearings are identically loaded. Moreover, the use of two bearings of identical design makes it possible to distribute the total friction uniformly among the two bearings. Temperatures are measured, for example, in the interior of the chamber 15 and/or on the outer race rings of the two test bearings.

The foregoing discussion relates to the essential improvements which are characteristic of the present invention. The overall structure, however, will be more readily appreciated from a consideration of the detailed elements comprising a preferred embodiment of the present invention.

Figure 2:
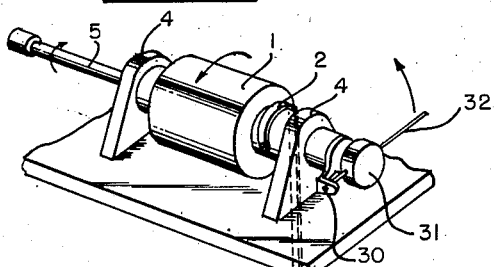
Figure 2 is a perspective view illustrating a portion of the structure shown in Figure 1.

The main structural parts of the entire machine comprise a machine frame in the form of a table acting as a mechanical part of the apparatus; and a switch cabinet which may, if desired, stand on the table and which may contain certain electrical equipment. The mechanical part mentioned previously includes the actual functioning portions of the grease testing machine, and includes the structure already described. This mechanical portion of the apparatus is illustrated in Figures 1 and 2.

In particular, referring to these figures, it will be seen that a starting motor 1 is provided, the stator of which is pivoted in a pedestal bearing 4 by means of flanged boxes 2 containing ball bearings 3. The particular starting motor 1 thus supported is of the so-called pendulum motor type. Its rotor shaft 5 carries at one end thereof an axially adjustable coupling 6 which is connected with the testing shaft 8 in the grease testing apparatus by means of a stud 7.

The actual testing bearings 9a and 9b, already described, have their inner rings or races mounted on the testing shaft 8, as illustrated. The outer rings or races of these bearings 9a and 9b, which bearings are, of course, the conical roller bearing type, sit in cylindrical boxes 10a and 10b. Box 10b is slidably movable, as already described, whereby it acts as a sleeve member, as also described; and the two boxes 10a and 10b actually comprise so-called testing heads. Electrical rheostats 11 of the ring heater type are preferably built into the apparatus adjacent the circumference of boxes 10a and 10b for heating purposes; and in addition, resistance thermometers 12 are preferably disposed in the testing heads 10a and 10b. The rheostats or heating elements 11, as well as resistance thermometers 12, can be connected by means of plugs to electrical conductors 13 and 14.

The testing heads 10a and 10b lead into a cylindrical testing chamber 15 having a window 16 provided for the purpose of observing the test bearings during their operation. The testing chamber 15 is, as illustrated, situated within a housing 17.

To one side of housing 17 adjacent the bottom thereof, is provided a pivot or bearing structure 18 which pivotally supports an angle lever 19. When properly installed, the upper end of angle lever 19 touches a projection centrally located on the testing head or sleeve member 10b whereby appropriate pivoting of lever member 19 effects the axial or thrust loading of the bearings in accordance with the present invention. The lower end of angle lever 19 may be provided with weights 21 attached to said lever 19 by means of a pull rod 20 whereby various different weights 21 can be provided, as shown, thereby to impose any desired axial loading on the bearings 9a and 9b.

Since the testing head or sleeve member 10b can be easily shifted axially, even in a heated condition, by means of an exactly determined radial play, the imposition of weights 21 on member 19 causes this head 10b and the testing shaft 8 to shift axially until testing head 10a impinges upon the illustrated shoulder of testing chamber 15 which in turn bears on a complementary shoulder of housing 17. In this manner, therefore, the two conical roller bearings 9a and 9b run, without play, under a centrally engaged axial weight which is determined exactly. By means of the built-in resistance thermometer 12, already mentioned, the operating temperature of the test bearings can be measured during rotation of shaft 8; and by means of pendulum motor 1, the torsional or frictional moment of the testing bearings 9a and 9b can also be measured.

In respect to this measurement of torsional or frictional moments, it should be noted that if the starting motor 1 produces a torsional moment in the sense indicated in Figure 2 (see the arrow), which torsional moment is imposed on starting shaft 5, a reaction force in the opposite direction is imposed on the stator of pendulum motor 1. The stator of said motor 1 is thereby set into motion and will tend to rotate if not prevented from doing so by an opposing force. This opposing force is, as illustrated in Figures 1 and 2, provided by a pendulum 22 mounted on shaft 23 in a frame 24 disposed under pendulum motor 1. The pendulum 22 is connected to the stator of pendulum motor 1 by means of a thin metal band 25; and pendulum movements of the starting motor are alleviated by a hydraulic shock-absorber so that the band 25 stays taut even under sudden variations of the torsional moment.

As a result of this structure, therefore, a given torsional moment produced by pendulum motor 1 always corresponds to the particular angle of the horizontal swing of its stator and of the pendulum 22 with respect to its shaft 23. Rotation of shaft 23 in turn adjusts a sliding contact 26 on a torsion potentiometer 27, the conductors of which lead, as do the conductors 14 of the resistance thermometer 12, to a recorder 29 (see Figure 3). The recorder 29, as will be described, accordingly records the operational temperatures of the testing bearings as well as their starting moment, during the test period.

As is illustrated in Figures 1 and 2, a weight 31 may be provided which is adjustably supported on a rod 32 connected to the pendulum motor 1 by means of a bracket 30 and the previously described flanged box 2. By moving weight 31 away from the mid-line of the motor 1 stator, this weight exercises a counter-moment upon the stator whereby the traverse angle of the stator and of the pendulum 22 is decreased. As a result, movement of counter-weight 31 acts to adjust the measuring range whereby greater torsional moments can be measured, as desired.

A heating regulator structure comprising an electrical control circuit (not illustrated) is preferably coupled to conductors 13 associated with heating coils 11; and by appropriate design of this heating regulator structure, it is possible to change the heating capacity during a relatively short test run in such a manner that the operational temperatures $\vartheta$ of the test bearings 9a and 9b rise nearly proportionally with time. The grease or lubricant in the testing bearings is accordingly exposed to a continually rising temperature and the changes in temperature as well as the torsional moment $M_d$ can accordingly be observed and recorded.

Figure 3:
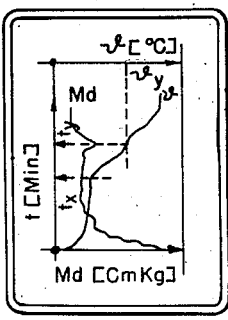
Figure 3 illustrates the face of a recorder such as may be employed in the present invention, and particularly illustrates curves produced thereon.

Figure 3 schematically illustrates the curves which can actually be recorded during such a test run. In the curves illustrated, auxiliary heating of the bearings (i.e. by heating coils 11) is commenced at a time $t_x$, whereafter the operational temperatures $\vartheta$ rise approximately linearly. At time $t_y$, or at temperature $\vartheta_y$, a non-uniformity in the temperature rise can be observed in the righthand curve of Figure 3; and such a non-uniformity also appears in the curve of torsional moment $M_d$, appearing in the lefthand portion of Figure 3. Upon occurrence of such a non-uniformity, the observation of the lubrication condition of the test bearings 9a and 9b is highly desirable in order to be able to detect changes in consistency of the lubricant. Such observation is effected through the window 16 mentioned previously; and in order to assist in the observation, a scintillation stroboscope can be built into the overall structure. The flashes of light produced by such a stroboscope are synchronized with the revolution speed of the testing bearings 9a and 9b, whereby these bearings seem to stand still and can be easily observed, as desired. The evaluation of the grease or lubricant being tested is accordingly made on the basis of the character of temperature and torsional moment during the test as well as on visual observations of the bearings themselves.

Figure 4:
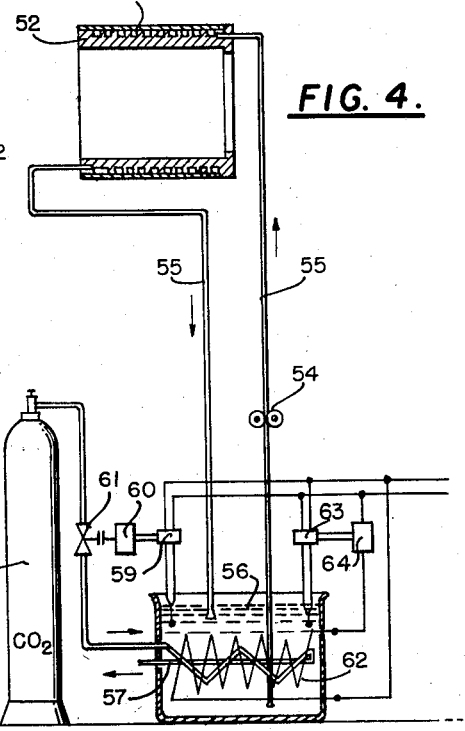
Figure 4 is a schematic diagram of a modified form of the present invention.

It should also be noted that lubricants can be tested under conditions of low temperature by structures constructed in accordance with the present invention. Such low temperatures can be effected, for example, by expansion of compressed carbon dioxide; and an alternative form of structure is shown in Figure 4 for effecting this latter form of test. The testing chamber 15, mentioned in reference to Figure 1, is, in accordance with this modified form of the invention, replaced by a testing chamber 52 (see Figure 4) of the same size. Chamber 52 includes an inner channel 53 running spirally about the circumference thereof; and oil may be passed from a bath 56 through this channel 53 by means of a pump 54 and pipe line 55. The oil thus flowing in channel 53 is cooled in oil bath 56 by a condenser coil 57 through which expanding carbon dioxide or carbonic acid flows from a tank 58.

A thermocouple unit 59 projects into oil bath 56 and this unit 59 is coupled by means of a switch 60 to a valve 61 adapted to control the flow of carbon dioxide from tank 58 to condenser coil 57. As a result, the oil in bath 56 can be cooled in a controlled manner, and this cooled oil, on circulating through channel 53 in chamber 52, effects a similar cooling of the test bearings and of the lubricant carried thereon.

A structure of the type shown in Figure 4 can in fact be employed for the testing of lubricants under high as well as under low temperatures; and in order to effect this diversity of operation, a heating coil 62, which may comprise for example an electrical immersion heater, can be placed in the oil bath 56, as illustrated. Additional thermocouple 63 connected to a switch 64 is employed to effect a controlled current flow through heating coil 62 thereby to effect a controlled heating of the oil bath 56. As a result, the bath 56 can either be heated or cooled, as may be desired, and as a practical matter the oil in oil bath 56 should comprise an oil the viscosity of which is not appreciably dependent upon temperature.

We claim:

1. A device for testing lubricants comprising a housing, a rotatable shaft in said housing, a first set of tapered roller bearings mounted between one end of said shaft and said housing, slidable means in said housing adjacent the other end of said shaft, a second set of tapered roller bearings between said other end of said shaft and said slidable means, said second set of roller bearings including a pair of races one of which races is carried by said shaft in substantially fixed relation thereto and the other of which races is carried by said slidable means in movable relation to said shaft, each of said sets of bearings being lubricated by a lubricant to be tested, and means applying an axial load to said slidable means and thereby to both said sets of lubricated bearings, whereby said bearings operate substantially free of play during rotation of said shaft.

2. The device of claim 1 wherein said first and second sets of roller bearings each have their axes disposed at an angle to said shaft, said slidable means comprising an axially movable sleeve member carrying the outer race of said second set of bearings.

3. A device for testing lubricants comprising a housing, a rotatable shaft in said housing, a set of tapered roller bearings disposed adjacent an end of said shaft for rotation with said shaft, said bearings including an inner race mounted within said housing in substantially fixed position relative to said end of said shaft, and an outer race mounted within said housing adjacent said end of said shaft and adapted to be shifted in position within said housing in a direction substantially parallel to said shaft, said bearings being lubricated by a lubricant to be tested, means for rotating said shaft comprising a motor mounted for restrained motion as a whole whereby said motor rotates as a whole through an angle related to the frictional moment of said bearings during rotation of said shaft, means for applying a preselected load to said shiftable outer race in a direction substantially parallel to said shaft during rotation of said bearings whereby said bearings rotate substantially free of play, and means for measuring and recording the frictional moment and operating temperature of said lubricated bearings during rotation thereof.

4. A device for testing lubricants comprising a housing, a rotatable shaft within said housing, a set of roller bearings lubricated by a lubricant to be tested, said roller bearings being disposed adjacent an end of said shaft with the axes of said bearings being at an angle to the axis of said shaft, means slidable in said housing adjacent said bearings for applying a preselected axial load to said bearings during rotation thereof, said bearings compriisng tapered roller bearings having an inner race and an outer race, said inner race being attached to said rotatable shaft and said outer race being carried by said slidable means, and means for recording the frictional moment and operating temperature of said lubricated bearings during rotation thereof.

5. A device for testing lubricants comprising a housing defining an interior chamber, a rotatable shaft in said housing and chamber, a motor coupled to said shaft for rotating said shaft, said motor being mounted for restrained rotation as a whole, a first set of roller bearings lubricated by a lubricant to be tested and disposed in said chamber with the rollers thereof at an angle to said shaft, said first set of bearings having one of its races carried by said shaft and the other of its races carried by said housing, slidable means in said housing, a second set of roller bearings lubricated by said lubricant to be tested and disposed in said chamber with the rollers thereof at an angle to said shaft, said second set of bearings having one of its races carried by said shaft and the other of its races carried by said slidable means, means applying a load to said slidable means and thereby to said lubricated bearings whereby said bearings operate substantially free of play during rotation of said shaft, and means for measuring the restrained rotation of said motor as a whole due to friction in said bearings thereby to determine the frictional moment of said bearings during said test.

6. A device for testing lubricants comprising a housing defining an interior chamber, a rotatable shaft in said housing and chamber, a motor coupled to said shaft for rotating said shaft, a first set of roller bearings in said chamber disposed at an angle to said shaft and having one of its races carried by said shaft and the other of its races carried by said housing, slidable means in said housing, a second set of roller bearings in said chamber disposed at an angle to said shaft and having one of its races carried by said shaft and the other of its races carried by said slidable means, said slidable means comprising a sleeve member slidable in said housing in a direction substantially coaxial with said shaft, each of said sets of bearings being lubricated by a lubricant to be tested, means applying a load to said slidable means and thereby to said lubricated bearings whereby said bearings operate substantially free of play during rotation of said shaft, auxiliary means for heating and/or cooling said bearings during rotation thereof, and means for automatically recording both the frictional moments and the temperature of said lubricated bearings during rotation thereof.

7. A device for testing lubricants comprising a housing defining an interior chamber, a rotatable shaft in said housing and chamber, means coupled to said shaft for rotating said shaft, a first set of roller bearings disposed in said chamber at an angle to said shaft and having one of its races mounted on said shaft and the other of its races mounted on said housing, a sleeve member slidable in said housing in a direction substantially coaxial with said shaft, a second set of roller bearings disposed in said chamber at an angle to said shaft and having one of its races mounted on said shaft and the other of its races mounted on said slidable sleeve member, each of said sets of bearings being lubricated by a lubricant to be tested, means applying a predetermined force to said sleeve member thereby to apply an axial load to said lubricated bearings during rotation of said shaft, and means for recording the temperature of said lubricated bearings during rotation of said shaft.

8. A device for testing lubricants comprising a housing open at one end thereof and containing a lubricant to be tested, a rotatable shaft in said housing, driving means coupled to said shaft for rotating said shaft, a first set of roller bearings disposed at an angle to said shaft adjacent the closed end of said housing, said first set of bearings having one of its races carried by said shaft and the other of its races carried by said housing, slidable means adjacent the open end of said housing adapted to close said open end, said slidable means being slidable in a direction substantially parallel to said shaft, a second set of roller bearings disposed at an angle to said shaft and having one of its races carried by sid shaft and the other of its races carried by said slidable means, each of said sets of bearings being lubricated by the lubricant in said housing, means applying a load to said slidable means thereby to apply an axial load to both sets of said lubricated bearings during rotation of said shaft, and means coupled to said driving means for measuring the frictional moment imposed by said bearings on said driving means during operation of said driving means.

9. A device for testing lubricants comprising a housing containing a lubricant to be tested, a rotatable shaft in said housing, a motor coupled to said shaft for rotating said shaft, a first set of roller bearings disposed within said housing between said shaft and said housing, said first set of roller bearings including a first pair of races one of which is carried by said shaft and the other of which is carried by said housing, slidable means in said housing, a second set of roller bearings disposed within said housing between said shaft and said slidable means, said second set of roller bearings including a second pair of races one of which is carried by said shaft and the other of which is carried by said slidable means, each of said sets of bearings being lubricated by the lubricant in said housing, means applying a load to said slidable means and thereby to said lubricated bearings whereby said bearings operate substantially free of play during rotation of said shaft, and means for simultaneously and continuously recording both the frictional moments and the temperature of said lubricated bearings during rotation thereof.

10. A device for testing lubricants comprising a housing, a rotatable shaft in said housing, two sets of tapered roller bearings angularly disposed to one another within said housing adjacent opposite ends of said shaft for rotation with said shaft, said sets of bearings each including a first race carried by said shaft in fixed positional relation thereto, at least one of said sets of bearings including a second race spaced from said shaft and shiftable in position relative thereto, said bearings being lubricated by said lubricant to be tested, means for applying a preselected load to said shiftable second race and thereby to said bearings in a direction substantially parallel to said shaft during rotation of said bearings whereby said bearings rotate substantially free of play during said lubricant test, driving means coupled to said shaft for rotating said shaft and bearings, and means coupled to said driving means for measuring and recording the frictional moment of said lubricated bearings during rotation thereof.

11. A device for testing lubricants comprising a housing, a rotatable shaft in said housing, a set of tapered roller bearings disposed in said housing adjacent said shaft for rotation with said shaft, said bearings being disposed at an angle to said shaft, said bearings including a pair of conical races one of which is fixed in position within said housing and the other of which is slidably movable in said housing, said bearings being lubricated within said housing by a lubricant to be tested, means for applying a preselected load to said slidably movable race in a direction substantially parallel to said shaft whereby said bearings rotate substantially free of play during said lubricant test, and means for recording the frictional moment and operating temperature of said lubricated bearings during rotation thereof.

12. A device for testing lubricants comprising a rotatable shaft, a set of tapered roller bearings disposed adjacent said shaft for rotation with said shaft, said bearings having a pair of races one of which is carried by said shaft in substantially fixed position relative to said shaft, means for lubricating said bearings with a lubricant to be tested, means attached to the other of said races for applying a loading force between said races thereby to slidably displace said pair of races relative to one another in a direction parallel to said shaft during said test whereby said roller bearings operate substantially free of play during rotation of said shaft, and means for recording the frictional moment and operating temperature of said lubricated bearings during rotation thereof.

13. A device for testing lubricants comprising a rotatable shaft, a set of tapered roller bearings disposed adjacent said shaft for rotation with said shaft, said bearings having a pair of races one of which is carried by said shaft in substantially fixed position relative to said shaft, means for lubricating said bearings with a lubricant to be tested, means attached to the other of said races for applying a loading force between said races thereby to slidably displace said pair of races relative to one another in a direction parallel to said shaft during said test whereby said roller bearings operate substantially free of play during rotation of said shaft, said means for slidably displacing said pair of races comprising a sleeve disposed adjacent one end of said shaft and movable in coaxial relation to said shaft, said other race being carried by said movable sleeve, and means for recording the frictional moment and operating temperature of said lubricated bearings during rotation thereof.

References Cited in the file of this patent

UNITED STATES PATENTS

| | | |
|---|---|---|
| 745,997 | Blake | Dec. 8, 1903 |
| 1,117,187 | Hess | Nov. 17, 1914 |
| 1,490,603 | Elverson | Apr. 15, 1924 |
| 1,990,771 | Boden | Feb. 12, 1935 |
| 2,033,588 | Pigott et al. | Mar. 10, 1936 |
| 2,045,555 | Almen | June 23, 1936 |
| 2,177,293 | Sibley | Oct. 24, 1939 |
| 2,296,657 | Wallace | Sept. 22, 1942 |
| 2,370,606 | Morgan | Feb. 27, 1945 |
| 2,519,378 | Kilpatrick | Aug. 22, 1950 |